United States Patent Office 3,250,609
Patented May 10, 1966

3,250,609
RARE EARTH METAL AND SILICON ALLOYS
Walter Bungardt and Rudolf Kallenbach, Essen, Germany, assignors to Ronson Corporation, Woodbridge, N.J., a corporation of New Jersey
No Drawing. Filed Jan. 29, 1965, Ser. No. 429,106
Claims priority, application Germany, Feb. 4, 1964, G 39,762
12 Claims. (Cl. 75—84)

This invention relates to alloys of the rare earth metals and silicon, and more particularly to the production of a granular, substantially phosphorus-free alloy of the rare earth metals and silicon by the pyrometallurgical reduction of naturally occurring ores of rare earth metals.

The rare earth metals are the 15 elements of the lanthanide series having atomic numbers 57 to 71 inclusive, and the most common alloy of the rare earth metals which contains the metals in the approximate ratio in which they occur in their most common naturally occurring ores is known as misch metal. The rare earth metals, and particularly cerium, are valuable alloying additives for improving the metallurgical properties of alloyed and unalloyed steel, cast iron and other metals. However, as the rare earth metals exhibit a great tendency to be oxidized, and particularly at high temperatures, the direct addition of these metals (for example, misch metal) to molten iron and steel ordinarily results in excessively high losses of the rare earth metals. As a result, the rare earth metals are ordinarily added to the molten metal in the form of alloys containing a relatively small proportion of rare earth metals. Examples of such rare earth metal-containing alloys have the following composition:

(1) 35 to 50% Si, 2 to 30% Ca, 1% Al, 3 to 40% Fe, 6 to 40% Mg and 0.5 to 10% rare earth metals, and
(2) 40% Si, 10% Ca, 1% Al, 30% Fe and 15% rare earth metals.

These rare earth metal-containing alloys are produced either by adding the rare earth metals in their relatively pure state to the molten mixture of the other components of the alloy or by adding small quantities of naturally occurring ores of the rare earth metals directly to the molten mixture of the other components of the alloy. In the latter case the rare earth metal ores are pyrometallurgically reduced in situ in the molten bath to produce the desired rare earth metal-containing alloy and a slag which is removed from the molten alloy.

The most important naturally occurring ores of the rare earth metals are monazite and bastnasite, although other scarce and commercially unimportant ores of the rare earth metals are known. Monazite is essentially an orthophosphate of the rare earth metals, and most of the other naturally occurring ores of these metals contain phosphorus in the form of phosphates in marked quantities. Rare earth metals substantially free of non-metallic impurities can be prepared by known procedures such, for example, as by the electrolysis of the fused rare earth metal chlorides or by the reduction of the anhydrous rare earth metal chlorides with metallic calcium or the like. The relatively pure rare earth metal product thus obtained is substantially free of phosphorus, and, as previously noted, it can be directly added to other alloying materials to form the rare earth metals-containing alloys employed to improve the metallurgical quality of steel and iron.

When the rare earth metal-containing alloys are prepared by adding naturally occurring ores of the rare earths to molten mixtures of other alloying materials, the resulting alloy product contains phosphorus approximately to the extent that it was present in the rare earth ore. As phosphorus has a deleterious effect on the quality of steel, the rare earth metal content of the rare earth metal-containing alloys produced by the last mentioned procedure ordinarily cannot exceed about 15% in order to avoid the inclusion of an excessive amount of phosphorus in the molten steel to which the alloy is added.

It has heretofore been the experience of workers skilled in the art that the direct pyrometallurgical reduction of naturally occurring rare earth metal ores results in the formation of a rare earth metal product containing, in proportion, approximately as much phosphorus as was present in the original ore. Attempts to produce alloys having a relatively high rare earth metal content by the direct reduction of rare earth ores have heretofore resulted in also increasing the phosphorus content of the alloy which impairs the metallurgical usefulness of the rare earth metal product.

It has now been found that, contrary to prior experience in this field, a substantially phosphorus-free rare earth metal alloy product can be produced by direct pyrometallurgical reduction of naturally occurring rare earth metal ores without prior treatment of the ore to remove or reduce the phosphorus content thereof. More specifically, it has been discovered that phosphorus-containing rare earth metal ores can be reduced pyrometallurgically by the direct reaction of certain metal silicides therewith to produce a substantially phosphorus-free rare earth metal and silicon alloy product. Moreover, the substantially phosphorus-free rare earth metal product obtained by the practice of the present invention is in the form of granules which can be added directly to molten steel and iron without the necessity for forming an intermediate, low grade rare earth metal-containing alloy of the type previously described.

In accordance with the present invention, a granular substantially phosphorus free alloy of rare earth metals and silicon is produced by reacting a phosphate-containing ore of rare earth metals with a quantity of at least one metal silicide sufficient to reduce the rare earth metal ore to the corresponding rare earth metals and metal silicides and to convert the phosphate content of the ore to metal phosphides. The phosphate-containing rare earth metal ore should contain at least about 0.5% by weight $P_2O_5$, and is selected from the group consisting of naturally occurring ores of the rare earth metal containing at least about 0.5% by weight $P_2O_5$ and a mixture of naturally occurring ores of the rare earth metals and sufficient added metal phosphate to bring the phosphate content of the mixture up to at least about 0.5% by weight $P_2O_5$. The metal silicides employed as the reducing agent are selected from the group consisting of the alkaline earth metal silicides and aluminum silicide. The pyrometallurgical reduction of the rare earth metal ore results in the formation of a phosphide-containing metal regulus and an alkaline earth metal- and/or aluminum-containing slag. The slag is removed from the metal regulus and the metal regulus is allowed to solidify. The solid metal regulus is then reacted with water, and preferably with atmospheric moisture, to convert the phosphide content thereof to phosphine, and in the course of this reaction the solid regulus breaks up into smaller granules of a substantially phosphorus-free product comprising predominantly an alloy of rare earth metals and silicon.

It has been found that the metal regulus does not readily decompose when treated with water unless the ore contains at least about 0.5% by weight $P_2O_5$. As previously pointed out, most naturally occurring ores of the rare earth metals contain marked quantities of phosphorus, and as a result most ores can be used in the practice of the present invention without adding additional phosphorus thereto. However, if the naturally occurring ore contains less than 0.5% by weight $P_2O_5$, the phosphorus content of the ore is brought up to the requisite minimum level by the addition thereto of extraneous metal phosphates. The extraneous metal phosphates added to the rare earth metal ore should be compatible with the ore and with the ultimate use of the rare earth metal alloy produced, and the phosphates of the metals of Groups II and III of the periodic table are generally satisfactory for this purpose. In particular rare earth metal phosphates, alkaline earth metal phosphates and aluminum phosphate are suitable additives for bringing the phosphate content of the ore up to at least 0.5% $P_2O_5$, and calcium phosphates and aluminum phosphates are presently preferred for this purpose.

The metal silicide employed as the pyrometallurgical reducing agent can be in one or more of the alkaline earth metal silicides and aluminum silicides. The reducing agent presently preferred is calcium silicide containing between about 30 to 60% by weight of calcium, and in particular between 30 and 40% by weight of calcium.

The amount of the metal silicide reducing agent added to the phosphorus-containing rare earth metal ore should be sufficient to reduce the rare earth metal ore to the corresponding rare earth metals and metal silicides and to convert the phosphate content of the ore to metal phosphides. Advantageously, the reaction mixture should contain between about 40% and 70% by weight of the metal silicide and between about 30% and 60% by weight of the phosphorus-containing ore, and preferably the reaction mixture contains between about 55 to 65% by weight of the metal silicide and between about 35 and 45% by weight of the ore. The rare earth metal and silicon alloy obtained as a product of the aforesaid reaction mixtures contains between about 30 to 50% by weight of rare earth metals.

It has been found advantageous to have the reaction take place in the presence of a suitable flux. The presently preferred flux for use in this connection is formed predominately of calcium fluoride and/or magnesium fluoride, and naturally occurring fluorite ($CaF_2$) has been found particularly useful for this purpose. It is presently preferred that the flux comprise at least about 10% by weight of the combined weight of the flux and reaction mixture. The molten flux is removed from the metal regulus along with the slag after the reduction reaction has run its course, and if desired the flux can be recovered and reused in a subsequent reduction operation.

It has also been found advantageous to carry out the reduction reaction in a series of separate incremental steps. In this modification of the process, a portion of the total amount of the metal silicide reducing agent to be used is added to the phosphorus-containing rare earth metal ore, and the reduction reaction between the reagents is initiated. After completion or substantial completion of the reaction between the ore and the first portion of the reducing agent, the balance of the metal silicide reducing agent is added to the reaction mixture in one or more additional steps until all of the reducing reagent has been added to and reacted with the ore. When the reducing agent is added to the ore in incremental steps, different metal silicides may be used in each stage of the reduction, although it is preferred that in the final stages calcium silicide be employed as the reducing agent.

On completion of the reduction reaction, the molten slag is removed from the phosphide-containing metal regulus, and the metal regulus is allowed to solidify. The metal regulus is then reacted with water, and preferably with the water vapor contained in the ordinary ambient atmosphere, in order to convert the phosphide content of the regulus to phosphine. Phosphine is a gaseous compound and thus escapes from the regulus. The reaction between the phosphide-containing metal regulus and water, and particularly the reaction between the phosphide-containing regulus and atmospheric moisture, is advantageously carried out at a slightly elevated temperature to increase the rate of reaction. The reaction between the water vapor and the phosphide content of the metal regulus causes the solid metal regulus to break up into smaller particles or granules which provide a very convenient form of the material for introduction into molten steel and other molten metals.

The granular rare earth metal and silicon alloy product obtained as a result of the process of the invention contains some residual phosphorus. However, the amount of phosphorus remaining in the rare earth metal-silicon alloy product is reduced to the point that it will have no appreciable deleterious effect on steel and other metals to which the alloy is added, and it is in this sense that the alloy product is referred to as being "substantially phosphorus-free."

The following examples are illustrative but not limitative of the practice of the invention:

*Example 1*

Sixty parts by weight of American bastnasite were mixed with 40 parts by weight of commercial Ca-Si alloy having a Ca content of about 30%. A flux consisting of fluoride was added to this mixture to the extent of 10% by weight of the combined weight of flux, ore and reducing agent.

This mixture was heated in a graphite crucible in an electric furnace at 1400° C. until complete liquefaction of the mixture occurred and the reaction between the ore and the reducing agent was complete. On completion of the reaction, the resulting metal regulus and slag was cooled and the slag removed therefrom. The metal regulus contained 35% by weight of metals of the rare earths, 47% by weight of silicon and 1% by weight of calcium. The remainder of the regulus comprised metals other than the rare earths which were additionally contained in the ore and in the reducing agent, as well as the phosphorus content of the ore now present in the form of a phosphide. The regulus decomposed spontaneously upon exposure to atmospheric moisture to form a granular product of about 0.1 to 0.5 mm. grain size. The phosphorus content of the granular product was less than 0.1% by weight.

*Example 2*

Fifty-five parts by weight of Congo bastnasite were mixed with 45 parts by weight of commercial Ca-Si alloy having a Ca content of about 30%, to which mixture was added 20% by weight of a flux consisting of equal parts by weight of $CaF_2$ and $MgF_2$. The mixture was reacted as before at 1500° C. The metal regulus obtained after the separation of the slag consisted of 35% by weight of metals of the rare earths, 50% by weight of silicon, 1% by weight of calcium, the usual admixtures, and also phosphorus present in the form of phosphide. The metal regulus decomposed in water, with the evolution of phosphine, to form a granular product having a grain size ranging from 0.08–0.5 mm. The phosphorus content in the granular product was less than 0.08% by weight.

We claim:

1. Process for producing a granular, substantially phosphorus-free alloy of rare earth metals and silicon which comprises heating a phosphate-containing ore of rare earth metals with a quantity of at least one metal silicide sufficient to reduce the rare earth ore to the corresponding rare earth metals and metal silicides, to convert the phosphate content of the ore to metal phosphides and to thereby form a slag, the phosphate-containing rare earth metal ore being selected from the group consisting of naturally occurring ores of the rare earth metals containing at least about 0.5% by weight $P_2O_5$ and a mixture of naturally occurring ores of the rare earth metals and sufficient added metal phosphates such that said mixture contains at least about 0.5% by weight $P_2O_5$, and said metal silicides being selected from the group consisting of the alkaline earth metal silicides and aluminum silicide, removing the slag from the metal regulus produced by the aforesaid reaction between the rare earth ore and the metal silicide, reacting the metal regulus with water to convert the phosphide content thereof to phosphine, and recovering a substantially phosphorus free granular alloy product comprising predominantly an alloy of rare earth metals and silicon.

2. The process for producing substantially phosphorus-free alloys of rare earth metals and silicon according to claim 1 in which a metal fluoride flux is added to the reaction mixture, said metal fluoride flux comprising at least one metal fluoride selected from the group consisting of the alkaline earth metal fluorides and aluminum fluoride.

3. The process for producing a granular, substantially phosphorus-free alloy of rare earth metals and silicon according to claim 2 in which the reaction mixture contains at least 10% by weight of said metal fluoride flux.

4. The process for producing granular, substantially phosphorus-free alloys of the rare earth metals and silicon according to claim 2 in which the flux comprises essentially calcium fluoride.

5. The process for producing granular, substantially phosphorus-free alloys of the rare earth metals and silicon according to claim 1 in which the reaction mixture contains between about 30 to 60 parts by weight of the phosphate-containing rare earth metal and between about 40 to 70 parts by weight of the metal silicide.

6. The process for producing a granular, substantially phosphorus-free alloy of the rare earth metals and silicon according to claim 1 in which the reaction mixture contains between about 35 to 45 parts by weight of the phosphate-containing rare earth metal and between about 55 and 65 parts by weight of the metal silicide.

7. The process for producing a granular, substantially phosphorus-free alloy of the rare earth metals and silicon according to claim 1 in which the metal phosphates added to the rare earth metal ore are selected from the group consisting of the rare earth metal phosphates, the alkaline earth metal phosphates and aluminum phosphate.

8. The process for producing a granular, substantially phosphorus-free alloy of the rare earth metals and silicon according to claim 1 in which the metal silicide comprises essentially calcium silicide containing between about 30 and 60% by weight of calcium.

9. The process for producing a granular, substantially phosphorus-free alloy of the rare earth metals and silicon according to claim 1 in which the metal silicide comprises calcium silicide containing between about 30 and 40% by weight of calcium.

10. The process for producing a granular, substantially phosphorus-free alloy of the rare earth metals and silicon according to claim 1 in which the reaction between the phosphorus-containing rare earth metal ore and the metal silicide is carried out in at least two incremental steps.

11. The process for producing a granular, substantially phosphorus-free alloy of the rare earth metals and silicon according to claim 1 in which the reaction mixture is heated to at least the fusion temperature thereof.

12. The process for producing a granular, substantially phosphorus-free alloy of the rare earth metals and silicon according to claim 1 in which the metal regulus obtained as a result of the reaction between the phosphorus-containing rare earth metal ore and the metal silicide is reacted with atmospheric moisture to convert the phosphide content thereof to phosphine.

References Cited by the Examiner
UNITED STATES PATENTS

| | | | |
|---|---|---|---|
| 1,087,099 | 2/1914 | Baskerville | 23—16 X |
| 1,981,126 | 11/1934 | Schulze | 23—16 |

CARL D. QUARFORTH, *Primary Examiner.*